United States Patent
Lee

(10) Patent No.: US 11,405,814 B2
(45) Date of Patent: Aug. 2, 2022

(54) METHOD AND APPARATUS FOR INFORMING RELAXED MEASUREMENT UPON EARLY MEASUREMENT REPORTING IN A WIRELESS COMMUNICATION SYSTEM

(71) Applicant: LG ELECTRONICS INC., Seoul (KR)

(72) Inventor: Oanyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 17/039,783

(22) Filed: Sep. 30, 2020

(65) Prior Publication Data
US 2021/0105647 A1   Apr. 8, 2021

(30) Foreign Application Priority Data

Oct. 2, 2019   (KR) .................. 10-2019-0122636

(51) Int. Cl.
*H04W 24/10* (2009.01)
*H04W 52/02* (2009.01)
*H04W 36/00* (2009.01)

(52) U.S. Cl.
CPC ....... *H04W 24/10* (2013.01); *H04W 36/0094* (2013.01); *H04W 52/0229* (2013.01)

(58) Field of Classification Search
CPC ............. H04W 24/10; H04W 36/0094; H04W 52/0229
See application file for complete search history.

(56) References Cited

U.S. PATENT DOCUMENTS

| 10,111,123 | B2 * | 10/2018 | Rune | H04W 36/0088 |
| 2014/0198680 | A1 * | 7/2014 | Siomina | H04L 5/16 370/252 |
| 2019/0223073 | A1 * | 7/2019 | Chen | H04W 74/008 |

FOREIGN PATENT DOCUMENTS

| CN | 113287339 A * | 8/2021 | H04L 5/0053 |
| WO | WO-2017014229 A1 * | 1/2017 | H04W 24/10 |
| WO | WO-2020249199 A1 * | 12/2020 | H04W 24/08 |

(Continued)

OTHER PUBLICATIONS

Section 5.6.20 of 3GPP TS 36.331 v15.6.0; (Jun. 2019); TS; 3GPP; TSGRAN; (E-UTRA); (RRC); Protocol specification (Release 15); 24 pages.

(Continued)

*Primary Examiner* — Deepa Belur
(74) *Attorney, Agent, or Firm* — Lee Hong Degerman Kang & Waimey

(57) ABSTRACT

A method and apparatus for informing relaxed measurement upon early measurement reporting in a wireless communication system is provided. A wireless device evaluates the at least one of the relaxed measurement conditions based on measurement results of the serving frequency. A wireless device performs relaxed measurement on the serving frequency and/or the at least one of neighbor frequencies based on the evaluation. A wireless device transmits, to the network, a message including 1) measurement results on each frequency of the frequency set, and 2) information on the relaxed measurement on the each frequency of the frequency set.

14 Claims, 12 Drawing Sheets

(56) References Cited

FOREIGN PATENT DOCUMENTS

WO     WO-2021058369 A1 *   4/2021
WO     WO-2022086379 A1 *   4/2022   ........... H04W 24/08

OTHER PUBLICATIONS

Section 5.2 of 3GPP TS 38.304 V15.2.0 and Section 5.2.4 of 3GPP TS 38.304 V15.2.0; (Dec. 2018) TS; 3GPP; TSGRAN; NR; User Equipment (UE) procedures in Idle mode and RRC Inactive state (Release 15); 28 pages.

Section 5.2 of 3GPP TS 38.331 V15.5.0; (Mar. 2019); TS; 3GPP; TSGRAN; NR; Radio Resource Control (RRC) protocol specification (Release 15); 25 pages.

Section 5.3.3 of 3GPP TS 38.331 V15.6.0 and Section 5.3.13 of 3GPP TS 38.331 V15.6.0; (Jun. 2019); TS; 3GPP; TSGRAN; NR; Radio Resource Control (RRC) protocol specification (Release 15); 519 pages.

\* cited by examiner

METHOD AND APPARATUS FOR INFORMING RELAXED MEASUREMENT UPON EARLY MEASUREMENT REPORTING IN A WIRELESS COMMUNICATION SYSTEM

CROSS-REFERENCE TO RELATED APPLICATIONS

Pursuant to 35 U.S.C. § 119 (a), this application claims the benefit of earlier filing date and right of priority to Korean Patent Application No. 10-2019-0122636, filed on Oct. 2, 2019, the contents of which are all hereby incorporated by reference herein in its entirety.

TECHNICAL FIELD

The present disclosure relates to a method and apparatus for informing relaxed measurement upon early measurement reporting in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

When a wireless device is in idle state and/or inactive state, the wireless device may perform neighbour cell measurement to support mobility. If the serving cell quality is above the threshold, the wireless device may expect that cell reselection does not occur immediately. Thus, the wireless device may choose not to perform the neighbour cell measurement to reduce power consumption.

If the serving cell quality is below the threshold so that the wireless device is performing the neighbour cell measurement, the wireless device may need to perform neighbour cell measurement on all the configured frequencies even if the serving cell quality is just below the threshold. In this case, a wireless device may perform relaxed measurement for saving power.

Several conditions for triggering the relaxed measurement have been discussed. If a wireless device satisfies at least one of the relaxed measurement conditions, the wireless device may perform the relaxed measurement.

On the other hand, a wireless device could be able to perform measurement in idle state and/or inactive state. For example, wireless device may receive idle mode measurement configuration and perform measurement on the frequencies included in the idle mode measurement configuration. The measurement in idle state and/or inactive state may be referred as 'early measurement', 'idle mode measurement', or 'idle/inactive measurement'. During accessing to the network, the wireless device could report the measurement results performed in idle state and/or inactive state.

When a wireless device performs relaxed measurement on the frequencies included the measurement configuration, some of the frequencies may be also included in the idle mode measurement (or early measurement) configuration.

In this case, the measurement results of overlapping frequencies (for example, frequencies included in both the measurement configuration and the idle mode measurement (or early measurement) configuration) may be result of relaxed measurement, whereas the measurement results of non-overlapping frequencies may be result of normal measurement, which is not the relaxed measurement.

However, when the network receives the measurement results of the frequencies, the network could not distinguish whether the measurement results are relaxed or not.

Therefore, studies for informing relaxed measurement upon early measurement reporting in a wireless communication system are needed.

In an aspect, a method performed by a wireless device in a wireless communication system is provided. A wireless device evaluates the at least one of the relaxed measurement conditions based on measurement results of the serving frequency. A wireless device performs relaxed measurement on the serving frequency and/or the at least one of neighbor frequencies based on the evaluation. A wireless device transmits, to the network, a message including 1) measurement results on each frequency of the frequency set, and 2) information on the relaxed measurement on the each frequency of the frequency set.

In another aspect, an apparatus for implementing the above method is provided.

The present disclosure can have various advantageous effects.

According to some embodiments of the present disclosure, a wireless device could inform relaxed measurement upon early measurement reporting efficiently in a wireless communication system.

For example, when a wireless device applying relaxed measurement on a certain frequency for early measurements, the wireless device could inform the network that the relaxed measurement has been applied on the certain frequency.

For example, the wireless device could indicate a certain frequency applied the relaxed measurement during reporting the early measurement results.

For example, when a wireless device applying relaxed measurement on at least one frequency for neighbour cell measurements and/or early measurements, the wireless device may indicate the network whether each of early measurement results is relaxed or not.

For example, the wireless device may inform the network a time length of how long the relaxed measurement on each frequency has been performed.

For example, the network may receive the early measurement results with indication of the relaxed measurement and/or the time period that the relaxed measurement has been performed.

Therefore, the network could receive the early measurement results successfully. For example, the network could recognize whether the relaxed measurement has been performed or how long the relaxed measurement has been performed.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
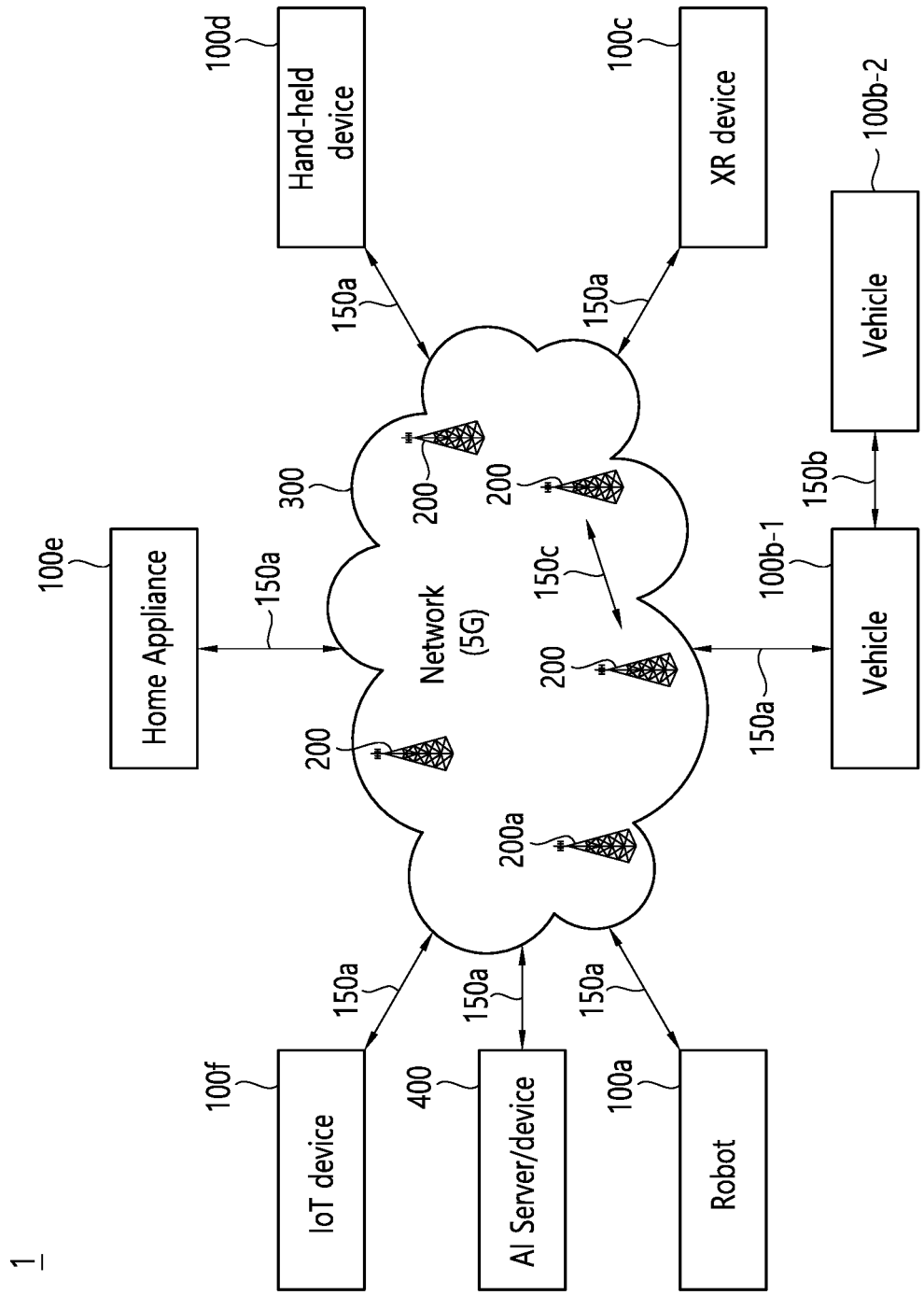
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructable wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
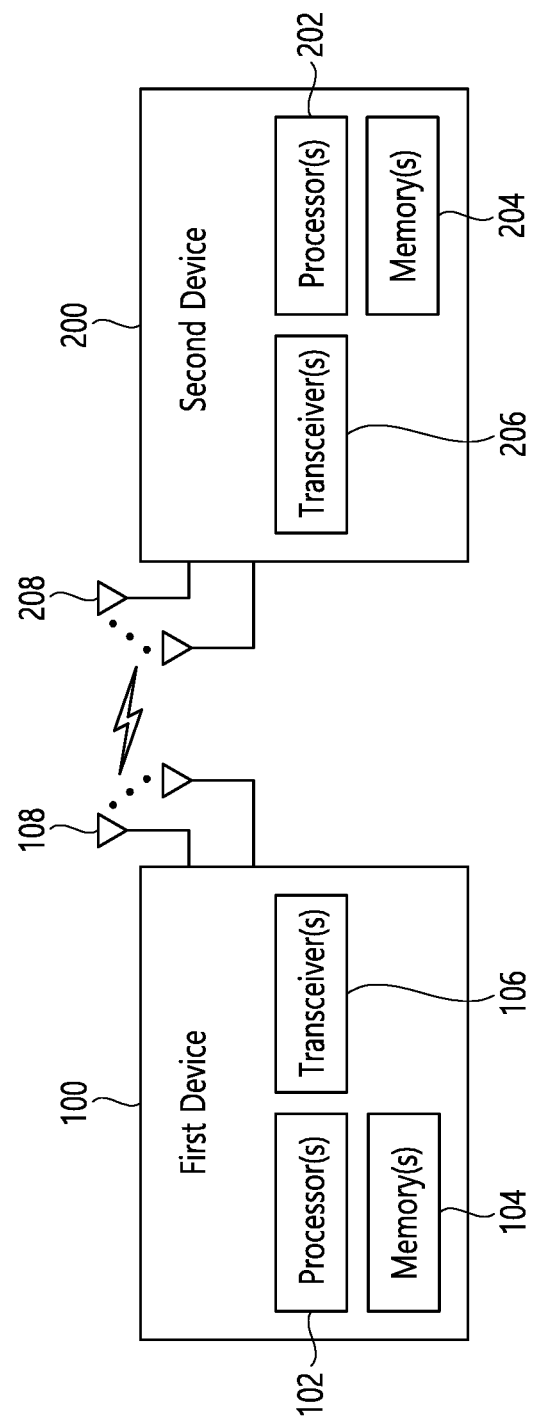
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
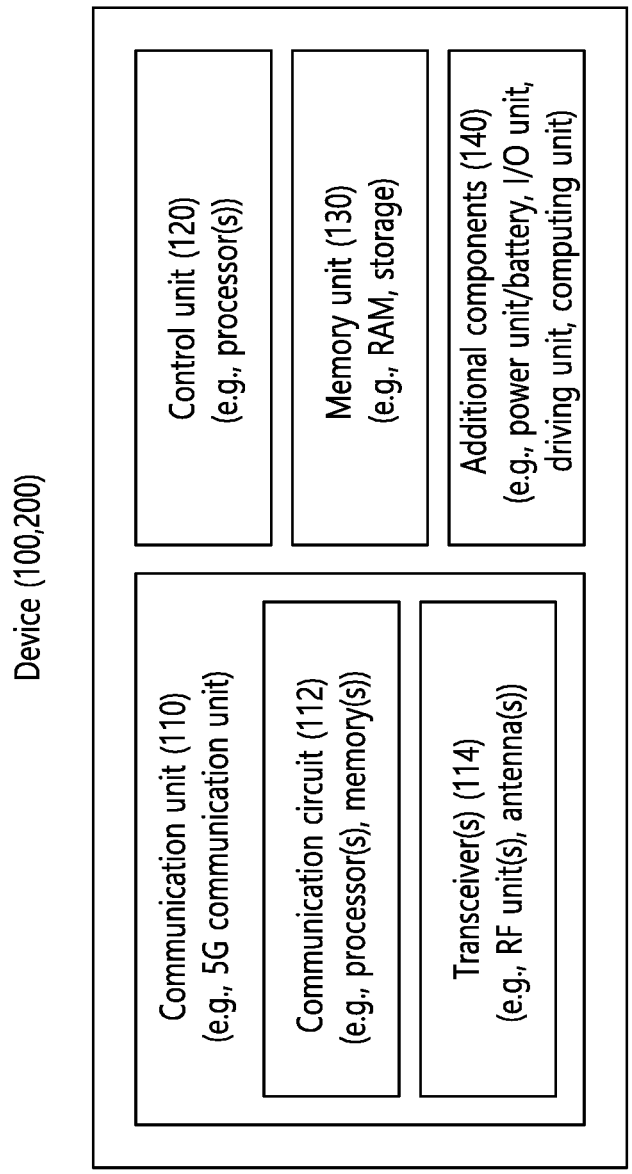
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
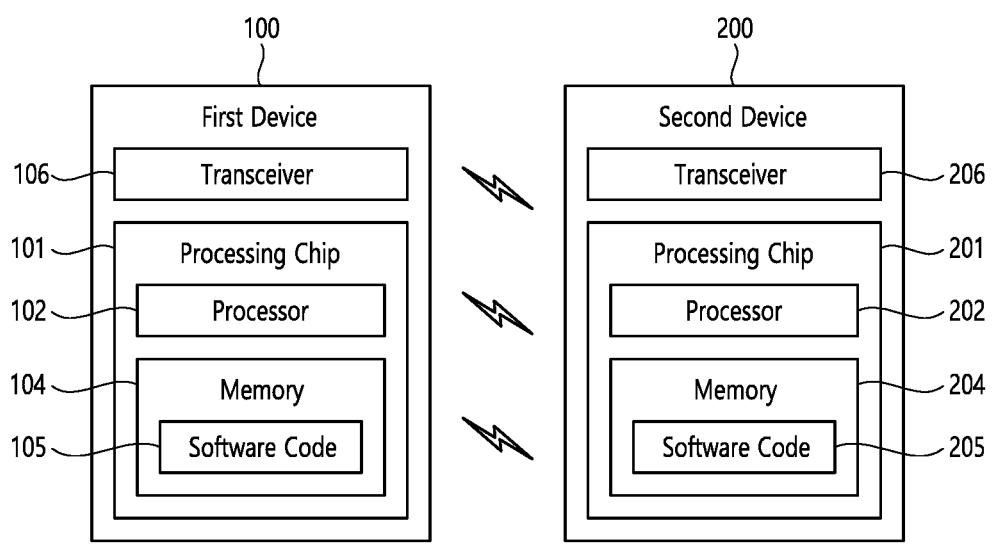
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
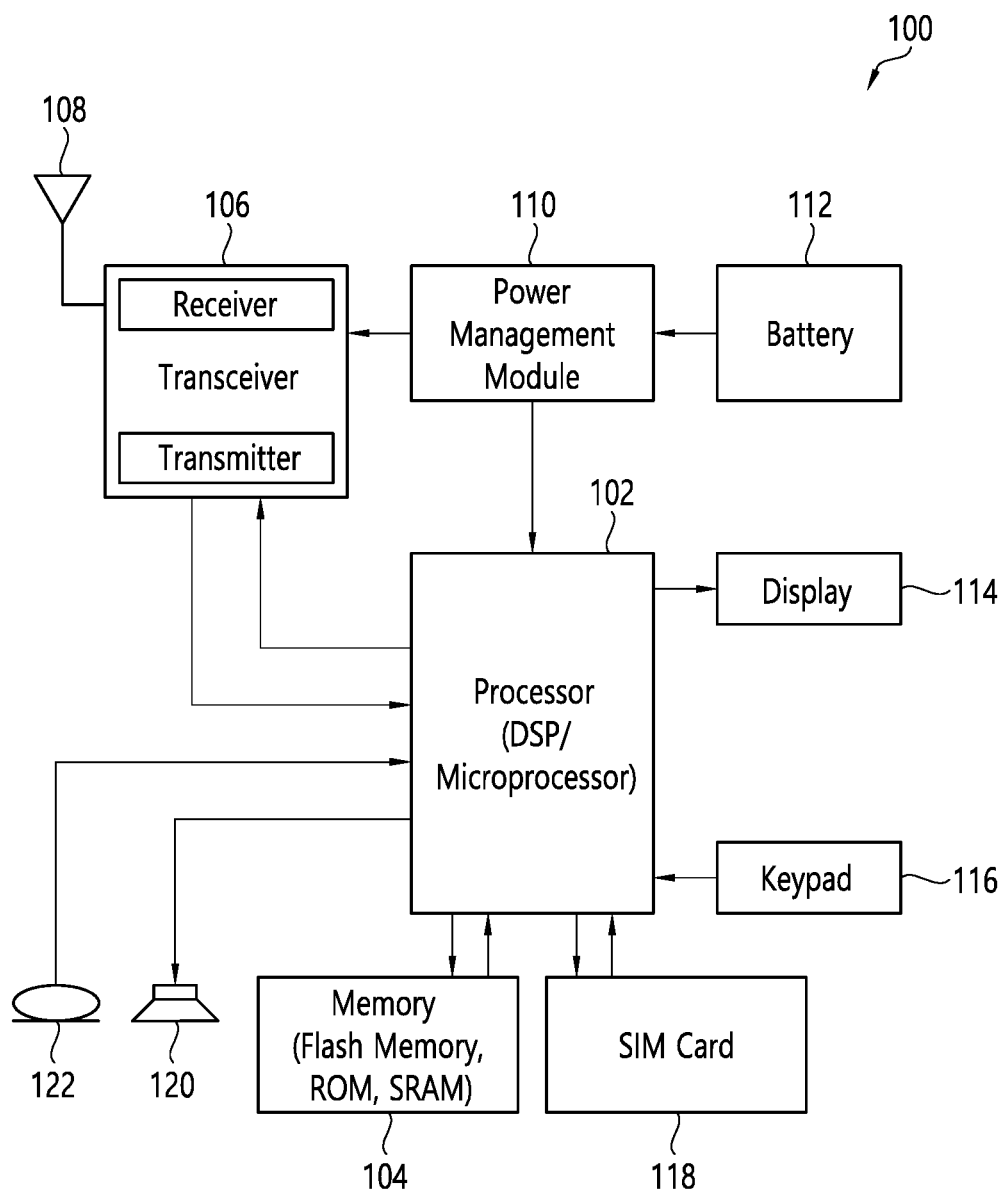
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
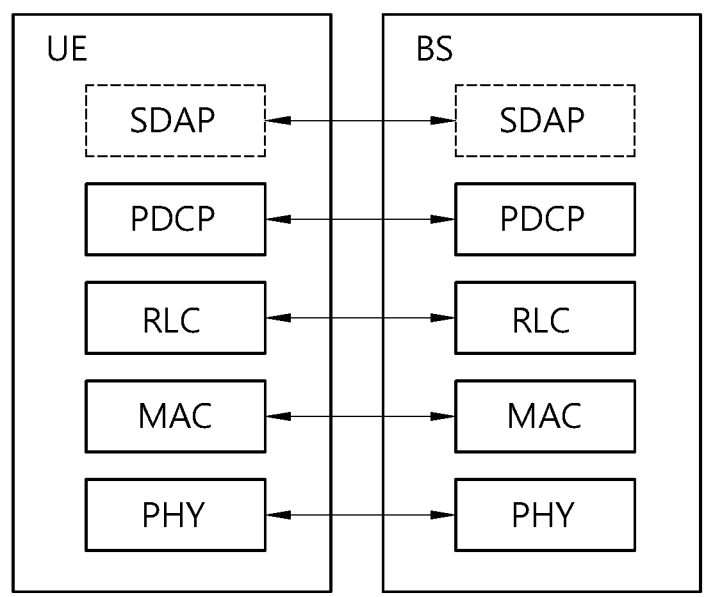
FIGS. 6 and 7 show an example of protocol stacks in a 3GPP based wireless communication system to which implementations of the present disclosure is applied.
Figure 7:
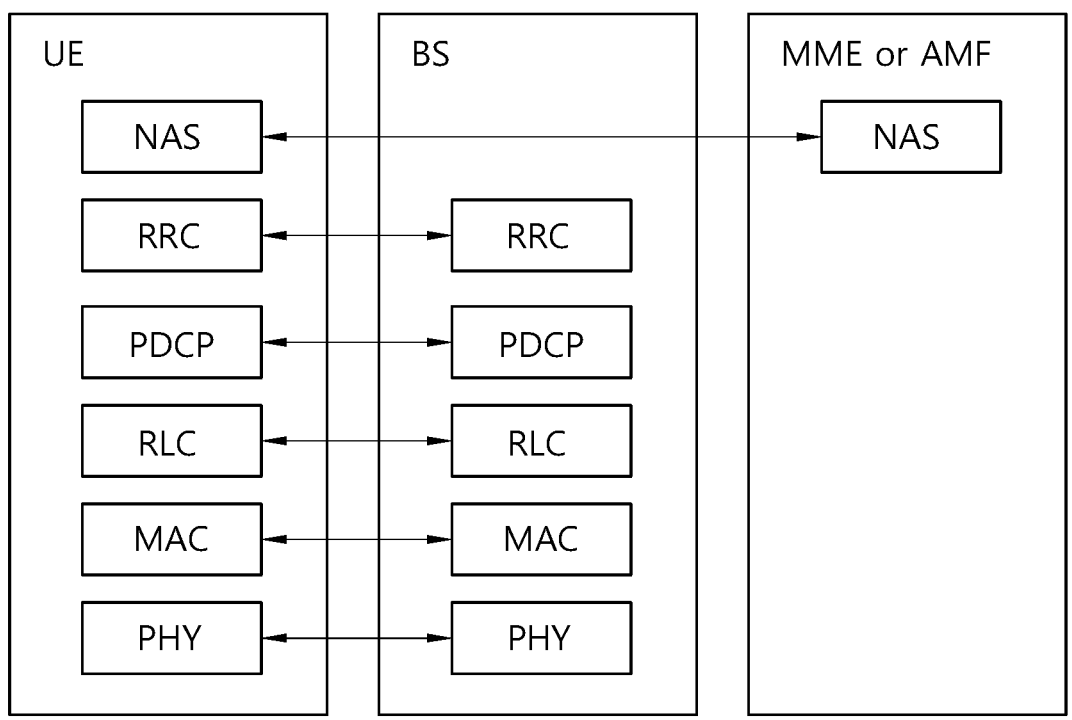

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and anon-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
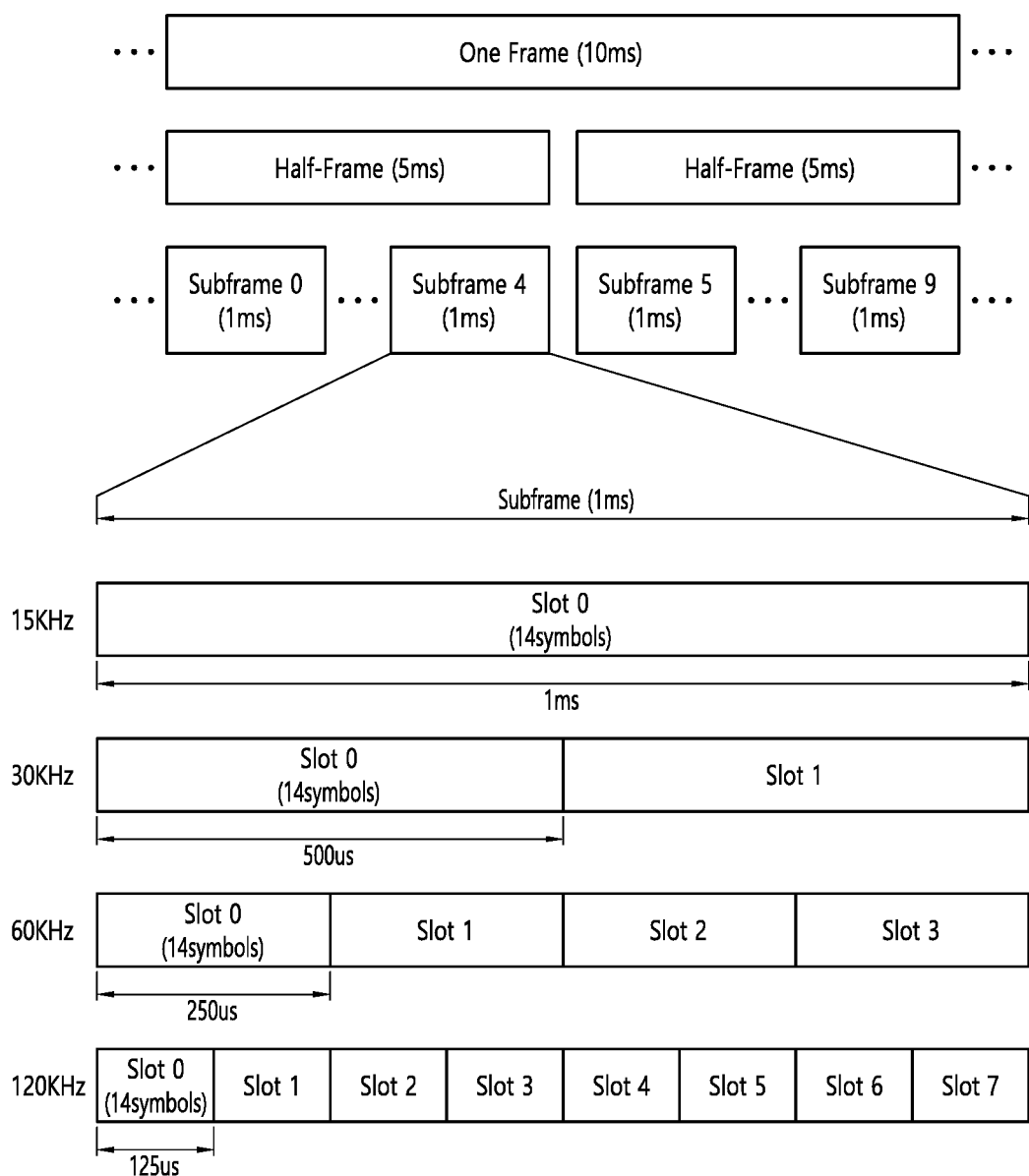
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
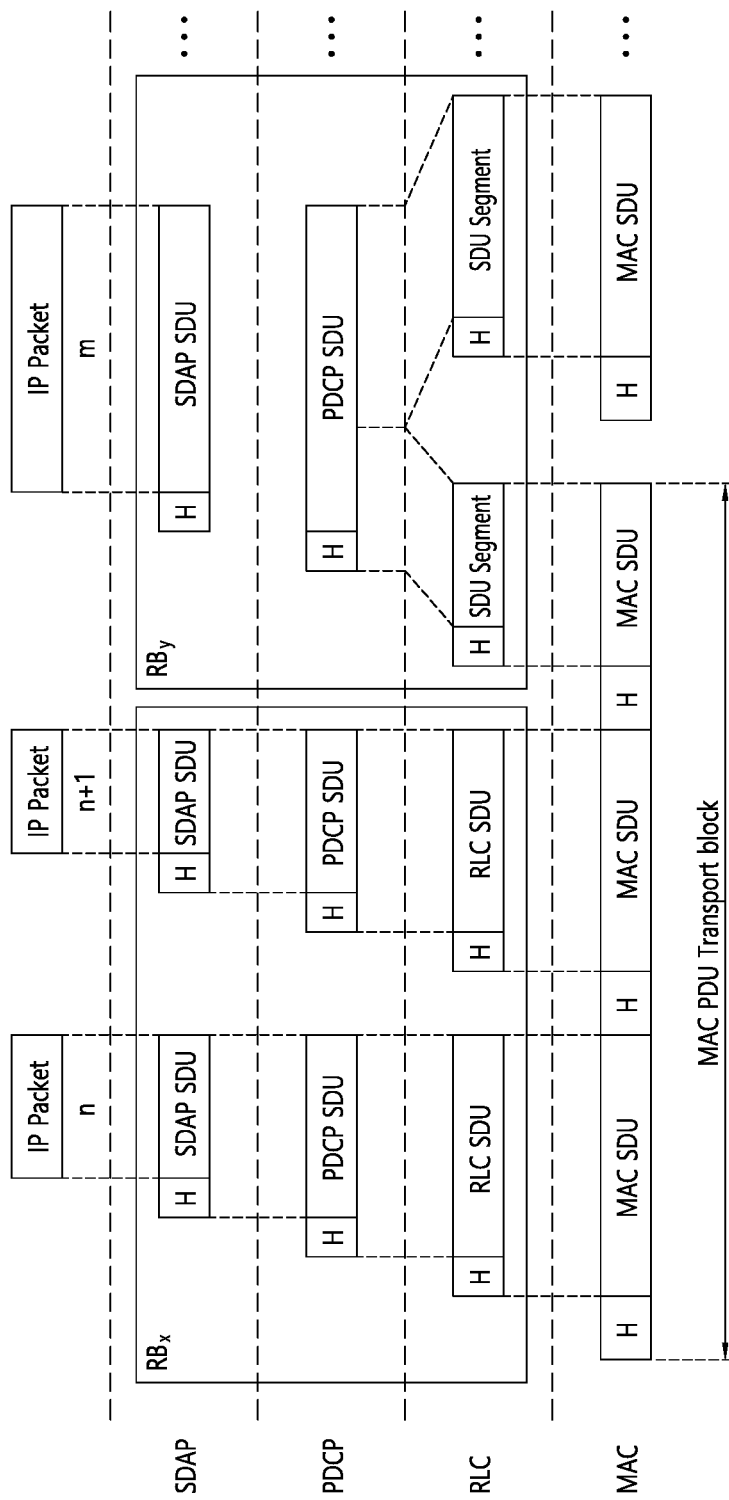
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

IDLE mode measurements is described. It may be referred to as Section 5.6.20 of 3GPP TS 36.331 v15.6.0 (2019-06-29).

This procedure specifies the measurements done by a UE in RRC_IDLE or RRC_INACTIVE when it has an IDLE mode measurement configuration and the storage of the available measurements by a UE in RRC_IDLE, RRC_INACTIVE and RRC_CONNECTED.

The IDLE mode measurement may be initiated as below. While T331 is running, the UE shall:
1> perform the measurements in accordance with the following:
2> for each entry in measIdleCarrierListEUTRA within VarMeasIdleConfig:
3> if UE supports carrier aggregation between serving carrier and the carrier frequency and bandwidth indicated by carrierFreq and allowedMeasBandwidth within the corresponding entry;
4> perform measurements in the carrier frequency and bandwidth indicated by carrierFreq and allowedMeasBandwidth within the corresponding entry;

The fields s-NonIntraSearch in SystemInformationBlockType3 do not affect the UE measurement procedures in IDLE mode. How the UE performs measurements in IDLE mode is up to UE implementation. UE is not required to perform idle measurements if the SIB2 does not contain idleModeMeasurements.
4> if the measCellList is included:
5> consider the serving cell and cells identified by each entry within the measCellList to be applicable for idle mode measurement reporting;
4> else:
5> consider the serving cell and up to maxCellMeasIdle strongest identified cells whose RSRP/RSRQ measurement results are above the value(s) provided in qualityThreshold (if any) to be applicable for idle mode measurement reporting;
4> store measurement results for cells applicable for idle mode measurement reporting within the VarMeasIdleReport;
3> else:
4> do not consider the carrier frequency to be applicable for idle mode measurement reporting;
1> if validityArea is configured in VarMeasIdleConfig and UE reselects to a serving cell whose physical cell identity does not match any entry in validityArea for the corresponding carrier frequency:
2> stop T331;

Cell selection process is described. It may be referred to as Section 5.2 of 3GPP TS 38.304 V15.2.0 (2018-12).

Cell selection is performed by one of the following two procedures:
a) Initial cell selection (no prior knowledge of which RF channels are NR frequencies):
  1. The UE shall scan all RF channels in the NR bands according to its capabilities to find a suitable cell.
  2. On each frequency, the UE need only search for the strongest cell.
  3. Once a suitable cell is found, this cell shall be selected.
b) Cell selection by leveraging stored information:
  1. This procedure requires stored information of frequencies and optionally also information on cell parameters from previously received measurement control information elements or from previously detected cells.
  2. Once the UE has found a suitable cell, the UE shall select it.
  3. If no suitable cell is found, the initial cell selection procedure in a) shall be started.

Priorities between different frequencies or RATs provided to the UE by system information or dedicated signalling are not used in the cell selection process.

Cell selection criterion is described.
The cell selection criterion S is fulfilled when:
Srxlev>0 AND Squal>0
S values, such as Srxlev and Squal, are described as below.
$Srxlev = Q_{rxlevmeas} - (Q_{rxlevmin} + Q_{rxlevminoffset}) - P_{compensation} - Qoffset_{temp}$
$Squal = Q_{qualmeas} - (Q_{qualmin} + Q_{qualminoffset}) - Qoffset_{temp}$
Q values related to the S values above are described in table 5 below.

TABLE 5

| | |
|---|---|
| Srxlev | Cell selection RX level value (dB) |
| Squal | Cell selection quality value (dB) |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |
| $P_{compensation}$ | If the UE supports the additionalPmax in the NR-NS-PmaxList, if present, in SIB1, SIB2 and SIB4:<br>max ($P_{EMAX1} - P_{PowerClass}$, 0) - (min ($P_{EMAX2}$, $P_{PowerClass}$) - min ($P_{EMAX1}$, $P_{PowerClass}$)) (dB);<br>else:<br>max ($P_{EMAX1} - P_{Powerclass}$, 0) (dB) |
| $P_{EMAX1}$, $P_{EMAX2}$ | MaximumTX power level of a UE may use when transmitting on the uplink in the cell (dBm) defined as $P_{EMAX}$. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and SIB4 for regular UL. |
| $P_{PowerClass}$ | Maximum RF output power of the UE (dBm) according to the UE power class. |

The signalled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN, the UE may check the S criteria of a cell using parameter values stored from a different cell of this higher priority PLMN.

Measurement rules for cell re-selection is described. It may be referred to as Section 5.2.4 of 3GPP TS 38.304 V15.2.0 (2018-12).

Following rules are used by the UE to limit needed measurements:

If the serving cell fulfils Srxlev>$S_{intraSearchP}$ and Squal>$S_{IntraSearchQ}$, the UE may choose not to perform intra-frequency measurements.

Otherwise, the UE shall perform intra-frequency measurements.

The UE shall apply the following rules for NR inter-frequencies and inter-RAT frequencies which are indicated in system information and for which the UE has priority:

For a NR inter-frequency or inter-RAT frequency with a reselection priority higher than the reselection priority of the current NR frequency, the UE shall perform measurements of higher priority NR inter-frequency or inter-RAT frequencies.

For a NR inter-frequency with an equal or lower reselection priority than the reselection priority of the current NR frequency and for inter-RAT frequency with lower reselection priority than the reselection priority of the current NR frequency:

If the serving cell fulfils Srxlev>$S_{nonIntraSearchP}$ and Squal>$S_{nonIntraSearchQ}$, the UE may choose not to perform measurements of NR inter-frequencies or inter-RAT frequency cells of equal or lower priority;

Otherwise, the UE shall perform measurements of NR inter-frequencies or inter-RAT frequency cells of equal or lower priority.

Intra-frequency and equal priority inter-frequency Cell Reselection criteria is described.

The cell-ranking criterion $R_s$ for serving cell and $R_n$ for neighbouring cells is defined by:

$R_s = Q_{meas,s} + Q_{hyst} - Qoffset_{temp}$
$R_n = Q_{meas,n} - Qoffset - Qoffset_{temp}$ The $R_s$ and $R_n$ may be referred as R value.

Q values related to the R values above are described in table 6 below.

TABLE 6

| | |
|---|---|
| $Q_{meas}$ | RSRP measurement quantity used in cell reselections. |
| Qoffset | For intra-frequency: Equals to Qoffset$_{s,n}$, if Qoffset$_{s,n}$ is valid, otherwise this equals to zero.<br>For inter-frequency: Equals to Qoffset$_{s,n}$ plus Qoffset$_{frequency}$, if Qoffset$_{s,n}$ is valid, otherwise this equals to Qoffset$_{frequency}$ |
| Qoffset$_{temp}$ | Offset temporarily applied to a cell. |

The UE shall perform ranking of all cells that fulfil the cell selection criterion S.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave.

In all cases, the UE shall reselect the new cell, only if the following conditions are met:

the new cell is better than the serving cell according to the cell reselection criteria specified above during a time interval TreselectionRAT;

more than 1 second has elapsed since the UE camped on the current serving cell.

Performing measurements is described. It may be referred to as Section 5.2 of 3GPP TS 38.331 V15.5.0 (2019-03).

An RRC_CONNECTED UE shall derive cell measurement results by measuring one or multiple beams associated per cell as configured by the network. For all cell measurement results in RRC_CONNECTED the UE applies the layer 3 filtering, before using the measured results for evaluation of reporting criteria and measurement reporting. For cell measurements, the network can configure RSRP, RSRQ or SINR as trigger quantity. Reporting quantities can be any combination of quantities (i.e. RSRP and RSRQ; RSRP and SINR; RSRQ and SINR; RSRP, RSRQ and SINR), irrespective of the trigger quantity.

The network may also configure the UE to report measurement information per beam (which can either be measurement results per beam with respective beam identifier(s) or only beam identifier(s)). If beam measurement information is configured to be included in measurement reports, the UE applies the layer 3 beam filtering. On the other hand, the exact L1 filtering of beam measurements used to derive cell measurement results is implementation dependent.

The UE shall:
1> whenever the UE has a measConfig, perform RSRP and RSRQ measurements for each serving cell for which servingCellMO is configured as follows:
2> if the reportConfig associated with at least one measId included in the measIdList within VarMeasConfig contains an rsType set to ssb and ssb-ConfigMobility is configured in the measObject indicated by the servingCellMO:
3> if the reportConfig associated with at least one measId included in the measIdList within VarMeasConfig contains a report QuantityRS-Indexes and maxNrofRS-IndexesToReport and contains an rsType set to ssb:
4> derive layer 3 filtered RSRP and RSRQ per beam for the serving cell based on SS/PBCH block;
3> derive serving cell measurement results based on SS/PBCH block;
2> if the reportConfig associated with at least one measId included in the measIdList within VarMeasConfig contains an rsType set to csi-rs and CSI-RS-ResourceConfigMobility is configured in the measObject indicated by the servingCellMO:
3> if the reportConfig associated with at least one measId included in the measIdList within VarMeasConfig contains a report QuantityRS-Indexes and maxNrojRS-IndexesToReport and contains an rsType set to csi-rs:
4> derive layer 3 filtered RSRP and RSRQ per beam for the serving cell based on CSI-RS;
3> derive serving cell measurement results based on CSI-RS;
1> for each serving cell for which servingCellMO is configured, if the reportConfig associated with at least one measId included in the measIdList within VarMeasConfig contains SINR as trigger quantity and/or reporting quantity:
2> if the reportConfig contains rsType set to ssb and ssb-ConfigMobility is configured in the servingCellMO:

3> if the reportConfigcontains a report QuantityRS-Indexes and maxNrofRS-IndexesToReport:
4> derive layer 3 filtered SINR per beam for the serving cell based on SS/PBCH block;
3> derive serving cell SINR based on SS/PBCH block;
2> if the reportConfig contains rsType set to csi-rs and CSI-RS-ResourceConfigMobility is configured in the servingCellMO:
3> if the reportConfig contains a report QuantityRS-Indexes and maxNrofRS-IndexesToReport:
4> derive layer 3 filtered SINR per beam for the serving cell based on CSI-RS;
3> derive serving cell SINR based on CSI-RS;
1> for each measId included in the measIdList within VarMeasConfig:
2> if the reportType for the associated reportConfig is set to reportCGI:
3> perform the corresponding measurements on the frequency and RAT indicated in the associated measObject using available idle periods;
3> if the cell indicated by reportCGI field for the associated measObject is an NR cell and that indicated cell is broadcasting SIB1:
4> try to acquire SIB1 in the concerned cell;
3> if the cell indicated by reportCGI field is an E-UTRA cell:
4> try to acquire SystemInformationBlockType1 in the concerned cell;
2> if the reportType for the associated reportConfig is periodical or event Triggered:
3> if a measurement gap configuration is setup, or
3> if the UE does not require measurement gaps to perform the concerned measurements:
4> if s-MeasureConfig is not configured, or
4> if s-MeasureConfig is set to ssb-RSRP and the NR SpCell RSRP based on SS/PBCH block, after layer 3 filtering, is lower than ssb-RSRP, or
4> if s-MeasureConfig is set to csi-RSRP and the NR SpCell RSRP based on CSI-RS, after layer 3 filtering, is lower than csi-RSRP:
5> if the measObject is associated to NR and the rsType is set to csi-rs:
6> if reportQuantityRS-Indexes and maxNrofRS-IndexesToReport for the associated reportConfig are configured:
7> derive layer 3 filtered beam measurements only based on CSI-RS for each measurement quantity indicated in report QuantityRS-Indexes;
6> derive cell measurement results based on CSI-RS for the trigger quantity and each measurement quantity indicated in reportQuantityCell using parameters from the associated measObject;
5> if the measObject is associated to NR and the rsType is set to ssb:
6> if reportQuantityRS-Indexes and maxNrofRS-IndexesToReport for the associated reportConfig are configured:
7> derive layer 3 beam measurements only based on SS/PBCH block for each measurement quantity indicated in report QuantityRS-Indexes;
6> derive cell measurement results based on SS/PBCH block for the trigger quantity and each measurement quantity indicated in reportQuantityCell using parameters from the associated meas Object;
5> if the measObject is associated to E-UTRA:
6> perform the corresponding measurements associated to neighbouring cells on the frequencies indicated in the concerned meas Object;
2> perform the evaluation of reporting criteria RRC connection establishment procedure is described. It may be referred to as Section 5.3.3 of 3GPP TS 38.331 V15.6.0 (2019-06).

The purpose of this procedure is to establish an RRC connection. RRC connection establishment involves SRB1 establishment. The procedure is also used to transfer the initial NAS dedicated information/message from the UE to the network.

The network applies the procedure e.g. as follows:
When establishing an RRC connection;
When UE is resuming or re-establishing an RRC connection, and the network is not able to retrieve or verify the UE context. In this case, UE receives RRCSetup and responds with RRCSetupComplete.

The UE initiates the procedure when upper layers request establishment of an RRC connection while the UE is in RRC_IDLE and it has acquired essential system information.

The UE shall ensure having valid and up to date essential system information before initiating this procedure.
Upon initiation of the procedure, the UE shall:
1> if the upper layers provide an Access Category and one or more Access Identities upon requesting establishment of an RRC connection:
2> perform the access control procedure using the Access Category and Access Identities provided by upper layers;
3> if the access attempt is barred, the procedure ends;
1> apply the default L1 parameter values as specified in corresponding physical layer specifications except for the parameters for which values are provided in SIB1;
1> apply the default MAC Cell Group configuration;
1> apply the CCCH configuration;
1> apply the timeAlignmentTimerCommon included in SIB1;
1> start timer T300;
1> initiate transmission of the RRCSetupRequest message;

RRC connection resume procedure is described. It may be referred to as Section 5.3.13 of 3GPP TS 38.331 V15.6.0 (2019-06).

The purpose of this procedure is to resume a suspended RRC connection, including resuming SRB(s) and DRB(s) or perform an RNA update.

The UE initiates the procedure when upper layers or AS (when responding to RAN paging or upon triggering RNA updates while the UE is in RRC_INACTIVE) requests the resume of a suspended RRC connection.

The UE shall ensure having valid and up to date essential system information before initiating this procedure.
Upon initiation of the procedure, the UE shall:
1> if the resumption of the RRC connection is triggered by response to NG-RAN paging:
2> select '0' as the Access Category;
2> perform the unified access control procedure using the selected Access Category and one or more Access Identities provided by upper layers;
3> if the access attempt is barred, the procedure ends;
1> else if the resumption of the RRC connection is triggered by upper layers:
2> if the upper layers provide an Access Category and one or more Access Identities:

3> perform the unified access control procedure using the Access Category and Access Identities provided by upper layers;
4> if the access attempt is barred, the procedure ends;
2> set the resumeCause in accordance with the information received from upper layers;
1> else if the resumption of the RRC connection is triggered due to an RNA update:
2> if an emergency service is ongoing:
How the RRC layer in the UE is aware of an ongoing emergency service is up to UE implementation.
3> select '2' as the Access Category;
3> set the resumeCause to emergency;
2> else:
3> select '8' as the Access Category;
2> perform the unified access control procedure using the selected Access Category and one or more Access Identities to be applied;
3> if the access attempt is barred:
4> set the variable pendingRnaUpdate to true;
4> the procedure ends;
1> if the UE is in NE-DC or NR-DC:
2> release the MR-DC related configurations from the UE Inactive AS context, if stored;
1> release the MCG SCell(s) from the UE Inactive AS context, if stored;
1> apply the default L1 parameter values as specified in corresponding physical layer specifications, except for the parameters for which values are provided in SIB1;
1> apply the default SRB1 configuration;
1> apply the default MAC Cell Group configuration;
1> release delayBudgetReportingConfig from the UE Inactive AS context, if stored;
1> stop timer T342, if running;
1> release overheatingAssistanceConfig from the UE Inactive AS context, if stored;
1> stop timer T345, if running;
1> apply the CCCH configuration;
1> apply the timeAlignmentTimerCommon included in SIB1;
1> start timer T319;
1> set the variable pendingRnaUpdate to false;
1> initiate transmission of the RRCResumeRequest message or RRCResumeRequest1

Meanwhile, when a UE is in RRC_IDLE and/or INACTIVE, the UE may perform neighbour cell measurement to support mobility. If the serving cell quality is above the threshold (for example, $S_{IntraSearch}$, $S_{IntraSearchP}$), the UE may choose not to perform the neighbour cell measurement to reduce power consumption, as it is expected that cell reselection does not occur immediately.

If the serving cell quality is below the threshold so that the UE is performing the neighbour cell measurement, the UE may need to perform neighbour cell measurement on all the configured frequencies even if the serving cell quality is just below the threshold. Therefore, for power saving of the UE, how to trigger and perform relaxed measurement has been discussed.

There could be several conditions for triggering the relaxed measurement. If a UE satisfies at least any of the relaxed measurement conditions, it means that mobility of the UE might not happen soon so that it is not risky to relax the neighbour cell measurements.

For example, during performing the relaxed measurement, the UE may extend the measurement period, reduce the required number of cells to be measured, and/or reduce the number of frequencies to be measured.

For other example, during performing the relaxed measurement, the UE may extend the measurement period to infinity. It means that the UE may choose not to perform the measurement. In other words, the UE may perform no measurement as means of the relaxed measurement.

On the other hand, if a UE is capable of idle mode measurement and received idle mode measurement configuration (for example, MeasIdleConfig), the UE may perform measurement on the frequencies included in the idle mode measurement configuration (for example, it may be called 'early measurement' instead of 'idle mode measurement'). When the UE accesses to the network, if the UE has valid idle mode measurement results based on idle mode measurement (or early measurement) on the frequencies included in the idle mode measurement configuration, the UE may include the indication in the RRCConnectionSetupComplete message or RRCConnectionResumeComplete message indicating that the UE has available measurement results to be reported. Upon receiving the indication, the network can request the UE to report the available idle mode measurement (or early measurement) results via UEInformationRequest message. Then the UE may include the stored idle mode measurement (or early measurement) results in the UEInformationResponse message and discard the measurement results after the UEInformationResponse message is successfully transmitted.

As described above, there are two kinds of measurement in idle state and/or inactive state. The first measurement could be configured for supporting mobility (for example, measurement for cell reselection). The second measurement could be configured for early reporting (for example, reporting the stored measurement results right after entering to the RRC_CONNECTED stat).

When a UE performs relaxed measurement on the frequencies included in the measurement configuration, some of the frequencies may be also included in the idle mode measurement (or early measurement) configuration. Therefore, the measurement results of overlapping frequencies (i.e., frequencies included in both the measurement configuration the idle mode measurement (or early measurement)) may be result of relaxed measurement, whereas the measurement results of non-overlapping frequencies may be result of normal measurement (i.e., not relaxed). However, when the network receives the measurement results of the frequencies, the network cannot distinguish whether the measurement results are relaxed.

When a wireless device performs relaxed measurement on the frequencies included the measurement configuration, some of the frequencies may be also included in the idle mode measurement (or early measurement) configuration.

In this case, the measurement results of overlapping frequencies (for example, frequencies included in both the measurement configuration and the idle mode measurement (or early measurement) configuration) may be result of relaxed measurement, whereas the measurement results of non-overlapping frequencies may be result of normal measurement, which is not the relaxed measurement.

However, when the network receives the measurement results of the frequencies, the network could not distinguish whether the measurement results are relaxed or not.

Therefore, studies for informing relaxed measurement upon early measurement reporting in a wireless communication system.

Hereinafter, a method and apparatus for informing relaxed measurement upon early measurement reporting in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 10:
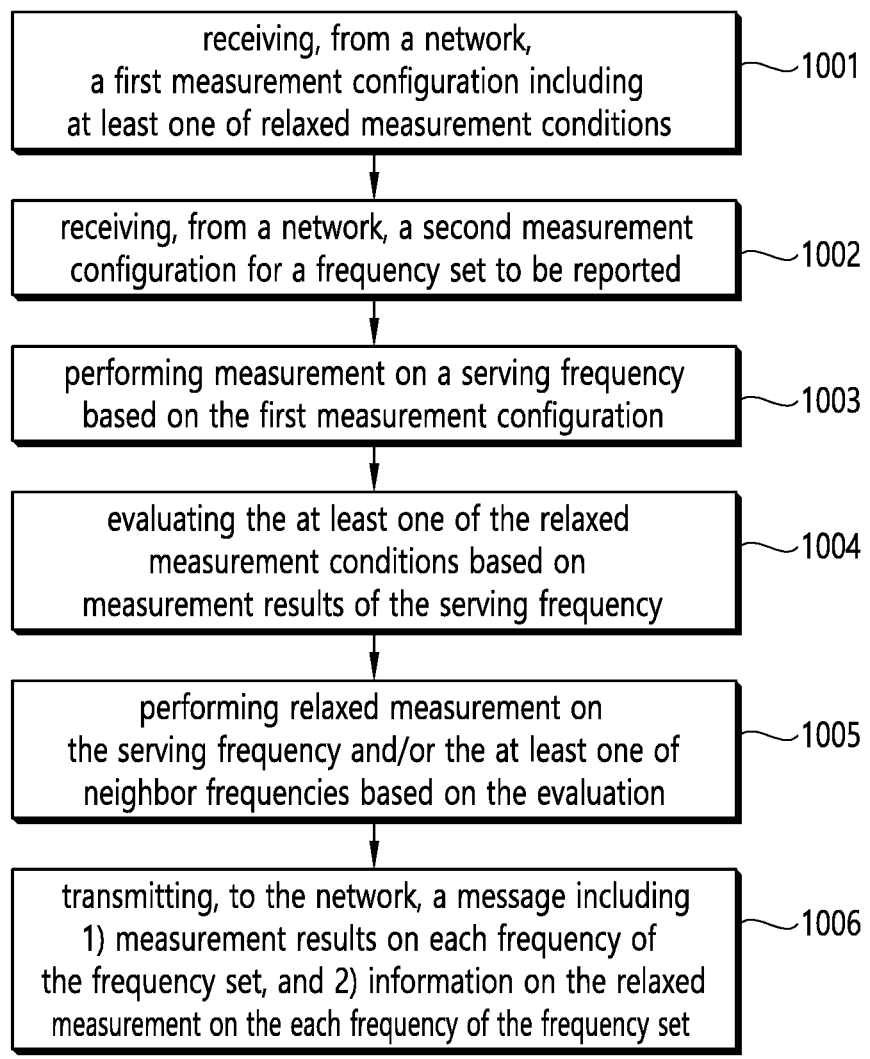
FIG. 10 shows an example of a method for informing relaxed measurement upon early measurement reporting in a wireless communication system, according to some embodiments of the present disclosure.

FIG. 10 shows an example of a method for informing relaxed measurement upon early measurement reporting in a wireless communication system, according to some embodiments of the present disclosure. In particular, FIG. 10 shows an example of a method performed by a wireless device.

In step 1001, a wireless device may receive, from a network, a first measurement configuration including at least one of relaxed measurement conditions;

The first measurement configuration may include measurement configuration for mobility of the wireless device. For example, the first measurement configuration may be for a cell selection and/or a cell reselection. The wireless device may perform measurement for the cell selection and/or the cell reselection in idle state and/or inactive state based on the first measurement configuration. For other example, the first measurement configuration may be for a handover procedure. The wireless device may perform measurement for the handover procedure in connected state.

The first measurement configuration may include a relaxed measurement configuration. For example, the wireless device may perform a relaxed measurement or no measurement in idle state and/or inactive state based on the first measurement configuration. For other example, the wireless device may perform a relaxed measurement or no measurement in connected state based on the first measurement configuration.

The first measurement configuration may include a first relaxed measurement condition and a second relaxed measurement condition.

The first relaxed measurement condition may be that the wireless device is stationary or with low mobility. For example, the wireless device may be considered as stationary or with low mobility based on that measurement results of a serving cell does not change more than a first threshold value during a time period.

The second relaxed measurement condition may be that the wireless device is not at cell edge. For example, the wireless device may be considered as being not at cell edge based on that measurement results of a serving cell is above a second threshold value.

According to some embodiments of the present disclosure, the relaxed measurement conditions included in the first measurement configuration may be described as below.

For example, the first relaxed measurement criterion (or the first relaxed measurement condition) for UE with low mobility may described as below.

The first relaxed measurement criterion for UE with low mobility is fulfilled when:

(Srxlev$_{Ref}$−Srxlev)<S$_{SearchDeltaP}$,
Where:
Srxlev=current Srxlev value of the serving cell (dB).
Srxlev$_{Ref}$=reference Srxlev value of the serving cell (dB), set as follows:

After selecting or reselecting a new cell, or
If (Srxlev−Srxlev$_{Ref}$)>0, or
If the relaxed monitoring criterion has not been met for T$_{SearchDeltaP}$:

The UE shall set the value of Srxlev$_{Ref}$ to the current Srxlev value of the serving cell.

For example, the second relaxed measurement criterion (or the second relaxed measurement condition) for UE not at cell edge may be described as below.

The relaxed measurement criterion for UE not at cell edge is fulfilled when:
Srxlev>S$_{SearchThresholdP}$, and,
Squal>S$_{SearchThresholdQ}$, if S$_{SearchThresholdQ}$ is configured,
Where:
Srxlev=current Srxlev value of the serving cell (dB).
Squal=current Squal value of the serving cell (dB).

In step 1002, a wireless device may receive, from a network, a second measurement configuration for a frequency set to be reported.

For example, the second measurement configuration may be measurement configuration for idle/inactive measurement, idle mode measurement, or early measurement. That is, the wireless device may perform measurement on frequency included in the frequency set in idle state and/or inactive state based on the second measurement configuration.

For other example, the second measurement configuration may be for measurement in connected state. That is, the wireless device may perform measurement on frequency included in the frequency set in connected state based on the second measurement configuration.

In step 1003, a wireless device may perform measurement on a serving frequency based on the first measurement configuration.

For example, the wireless device may perform the measurement on a serving cell while in idle state and/or inactive state based on the first measurement configuration.

For other example, the wireless device may perform the measurement on a serving cell while in connected state based on the first measurement configuration.

In step 1004, a wireless device may evaluate the at least one of the relaxed measurement conditions based on measurement results of the serving frequency.

For example, the wireless device may evaluate whether the at least one of the relaxed measurement conditions is met while in idle state and/or inactive state.

For other example, the wireless device may evaluate whether the at least one of the relaxed measurement conditions is met while in connected state.

In step 1005, a wireless device may perform relaxed measurement on the serving frequency and/or the at least one of neighbor frequencies based on the evaluation.

For example, the wireless device may perform the relaxed measurement on the serving cell and/or the at least one of the neighbor cells while in idle state and/or inactive state.

For other example, the wireless device may perform the relaxed measurement on the serving cell and/or the at least one of the neighbor cells while in connected state.

According to some embodiments of the present disclosure, the wireless device may perform the relaxed measurement in several ways. For example, the wireless device may use at least one of the following ways for the relaxed measurement.

For example, the wireless device may choose not to perform measurement on the serving call and/or the at least one of the neighbor cells. In other words, the wireless device may perform no measurement on the serving cell and/or the at least one of the neighbor cells as means of the relaxed measurement.

For example, the wireless device may extend time period of measurement on the serving cell and/or the at least one of the neighbor cells.

For example, the wireless device may reduce number of cells, carriers, and/or Synchronization Signal Block (SSB) to be measured for measurement on the serving cell and/or the at least one of the neighbour cells.

According to some embodiments of the present disclosure, a wireless device may select one or more frequencies among the serving frequency and/or the at least one of the neighbor frequencies for the relaxed measurement. In this case, the wireless device may perform the relaxed measurement on the selected one or more frequencies.

For example, the wireless device may perform measurement on at least one of the neighbor frequencies to select the one or more frequencies.

Otherwise, the wireless device may use the results of the measurement on the at least one of the neighbor frequencies performed before. For example, the wireless device may perform the measurement on the at least one of the neighbor frequencies based on the first measurement configuration or the second measurement configuration and store the measurement results. Then the wireless device could use the measurement results to select the one or more frequencies for the relaxed measurement.

For example, a wireless device may select a certain frequency among the serving frequency and/or the at least one of the neighbor frequencies based on that a highest ranked cell of the certain frequency is below a threshold value. The threshold value may be included in the first measurement configuration.

For example, a wireless device may select a certain frequency among the serving frequency and/or the at least one of the neighbor frequencies based on that quality of a cell on the certain frequency does not change more than a relative threshold value during a time period. The relative value and the time period may be included in the first measurement configuration.

For example, a wireless device may select a certain frequency among the serving frequency and/or the at least one of the neighbor frequencies based on that a certain frequency is included in a frequency list for the relaxed measurement. The frequency list for the relaxed measurement may be included in the first measurement configuration.

In step 1006, a wireless device may transmitting, to the network, a message including 1) measurement results on each frequency of the frequency set, and 2) information on the relaxed measurement on the each frequency of the frequency set.

According to some embodiments of the present disclosure, the information may inform whether the relaxed measurement is performed on the each frequency of the frequency set.

For example, the wireless device may transmit measurement report including the measurement results of each frequency and indication indicating whether each of the measurement results of the each frequency is generated by the relaxed measurement or not.

According to some embodiments of the present disclosure, the information may inform time length of how long the relaxed measurement on the each frequency of the frequency set is performed.

For example, the wireless device may transmit measurement report including the measurement results of each frequency and time length of how long the relaxed measurement on the each frequency of the frequency set is performed.

According to some embodiments of the present disclosure, the wireless device may be in communication with at least one of a user equipment, a network, or an autonomous vehicle other than the wireless device.

Figure 11:
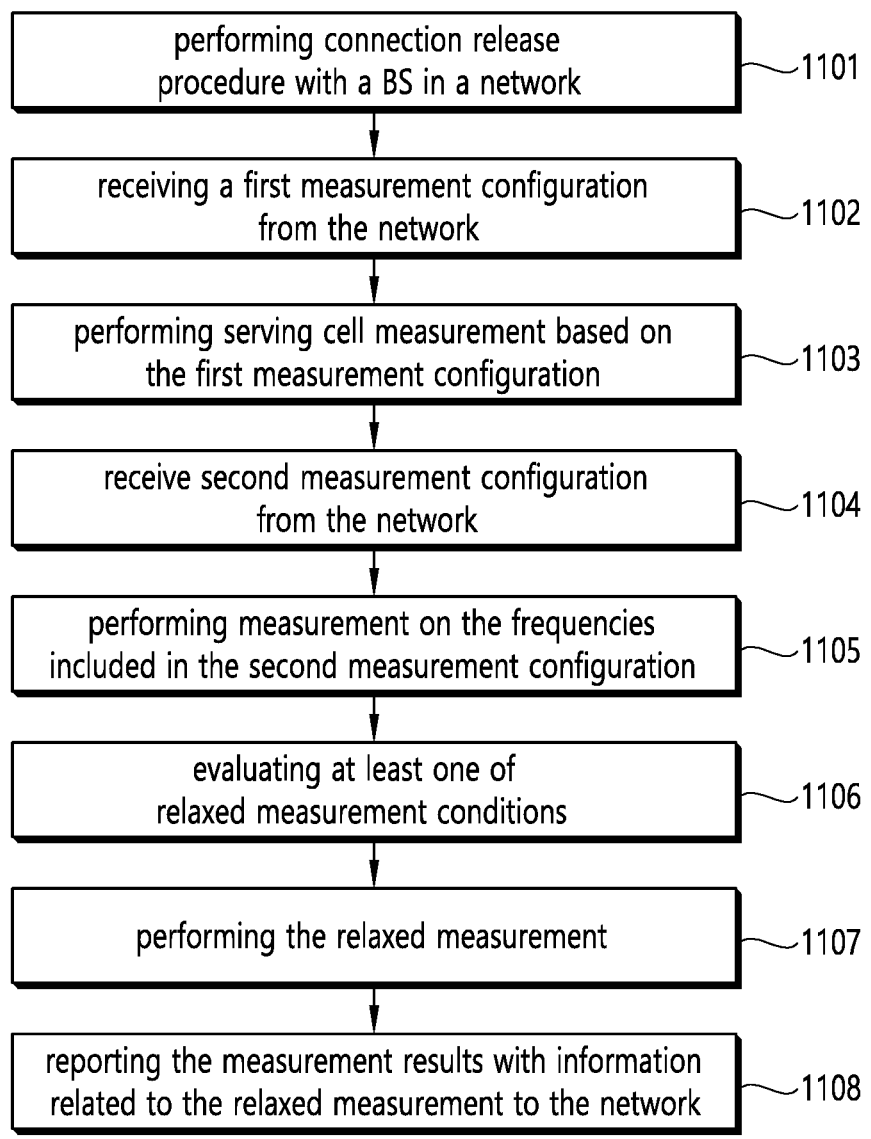
FIG. 11 shows an example of a method for informing relaxed measurement upon early measurement reporting in a wireless communication system, according to some embodiments of the present disclosure.

FIG. 11 shows an example of a method for informing relaxed measurement upon early measurement reporting in a wireless communication system, according to some embodiments of the present disclosure. In particular, FIG. 11 shows an example of a method performed by a wireless device, for example, a UE.

In FIG. 11, when the UE may report, to the network, the results of the early measurements, the UE may provide indication for a frequency whether the measurement results of the frequency is result of the relaxed measurement or not.

In step 1101, the UE may perform connection release procedure with a base station (BS) in a network. The UE may receive RRC release message from the BS. Upon receiving the RRC release message, the UE may enter RRC_IDLE and/or RRC_INACTIVE.

In step 1102, a UE may receive a first measurement configuration from the network.

The first measurement configuration may include a configuration of neighbour cell measurement.

The first measurement configuration may include at least one frequency to be measured. For example, the first measurement configuration may include a list of the at least one frequency to be measured.

For example, the measurement results can be used for UE mobility control. For example, the UE may perform serving cell measurement and/or neighbour cell measurements. Based on the measurement results on the frequencies included in the first measurement configuration, the UE may perform cell selection and/or cell reselection. In connected mode, the UE may report the measurement results to the network. Based on the measurement results, network may control UE mobility via issuing handover and/or mobility with sync.

If the UE is in RRC_IDLE or RRC_INACTIVE, the first measurement configuration may be provided via broadcast system information.

For example, System Information Block2 (SIB2), SIB3, SIB4, or SIB5 in NR may include the measurement configuration. For other example, SIB3, SIB4, SIB5, or SIB6 in LTE may include the measurement configuration. For example, each cell may broadcast different contents of each.

According to some embodiments of the present disclosure, the first measurement configuration may explicitly indicate whether the frequency included in the first measurement configuration is subject to relaxed measurements.

For example, the indication can be provided per frequency. That is, each indication may control whether the corresponding frequency is subject to relaxed measurement.

For another example, the indication can be provided per list of frequencies. That is, a single indication per list of frequencies may control whether the entire frequencies in the list are subject to relaxed measurement.

According to some embodiments of the present disclosure, the first measurement configuration may not explicitly indicate whether the frequency included in the first measurement configuration is subject to relaxed measurements.

In this case, this first measurement configuration itself may provide configuration parameters related to relaxed measurement.

According to some embodiments of the present disclosure, the first measurement configuration may include relaxed measurement condition related parameters.

In step 1103, the UE may perform serving cell measurement based on the first measurement configuration received in step 1102. The UE may perform neighbour cell measurement based on the first measurement configuration received in step 1102.

The UE may perform neighbour cell measurement on a frequency which is included in the first measurement configuration. The frequency may be intra-frequency or inter-frequency compared with serving frequency.

In step 1104, the UE may receive second measurement configuration from the network. The second measurement configuration may include a configuration of idle mode measurement and/or early measurement. The idle mode measurement and/or early measurement may be used for the purpose of fast Carrier Aggregation (CA) and/or Dour Connectivity (DC) setup. The measurement results of the idle mode measurement and/or early measurement may be stored. The availability of the measurement results of the idle mode measurement and/or early measurement may be reported during connection establishment, for example, via the RRCConnectionSetupComplete message and/or RRCConnectionResumeComplete message. The measurement results of the idle mode measurement and/or early measurement may be reported after completing the connection establishment.

The second measurement configuration may be provided via broadcast system information.

The second measurement configuration may be provided via dedicated signalling (for example, RRCRelease message).

In step 1105, the UE may perform measurement on the frequencies included in the second measurement configuration received in step 1104.

The UE may store the measurement results. When the UE is in RRC_CONNECTED, the UE may report the stored measurement results to the network.

In step 1106, the UE may evaluate at least one of relaxed measurement conditions based on the measurement results acquired in step 1103 by the serving cell measurement.

According to some embodiments of the present disclosure, at least one of the relaxed measurement conditions may be related to parameters for the relaxed measurement. The parameters could be included in the first measurement configuration received in step 1102.

According to some embodiments of the present disclosure, one of the relaxed measurement condition may be that UE is stationary or with low mobility.

For example, The UE may be considered as stationary or with low mobility if serving cell measurement quality does not change more than a relative threshold during a time period.

According to some embodiments of the present disclosure, one of the relaxed measurement condition may be that UE is not at cell edge.

For example, the UE may be considered as being not at cell edge if the measured Reference Signal Received Power (RSRP), Reference Signal Received Quality (RSRQ), and/or Signal to Interference & Noise Ratio (SINR) quality of serving cell (or beam) is above a threshold.

In step 1107, if the UE satisfies one or more relaxed measurement condition evaluated in step 1106, the UE may perform the relaxed measurement.

According to some embodiments of the present disclosure, the UE may perform relaxed measurement on a selected frequency. The UE may perform normal measurements, which is not a relaxed measurement or no measurement, on a not selected frequency.

The UE may select one or more frequencies to perform relaxed measurement, among the frequencies included in the first measurement configuration. For example, the UE may use at least one of the selection conditions below. If this selective relaxed measurement is applied, the UE may perform normal measurements on the frequencies which the selection condition is not met.

For example, the UE may select a frequency if the highest ranked cell of the frequency is below a threshold, as the frequency subject to relaxed measurement.

For example, the UE may select a frequency if measured quality of a cell of the frequency does not change more than a relative threshold during a time period, as the frequency subject to relaxed measurement.

For example, the UE may select all the frequencies which are explicitly indicated subject to relaxed measurement in the first measurement configuration, as the frequency subject to relaxed measurement.

According to some embodiments of the present disclosure, the UE may perform the relaxed measurement on a frequency in several ways.

For example, when the UE performs the relaxed measurement on a frequency, the UE may extend the time period for measurements on the frequency.

For example, when the UE performs the relaxed measurement on a frequency, the UE may reduce required number of cells, carriers, and/or Synchronization Signal Block (SSB) to be measured for measurements on the frequency.

For example, when the UE performs the relaxed measurement on a frequency, the UE may extend the measurement period to infinity for measurements on the frequency. In other words, the UE may choose not to perform the measurement on the frequency as means of the relaxed measurement.

In step 1108, the UE may report, to the network, the measurement results with information related to the relaxed measurement. The measurement results may be generated from measurement on frequencies and stored at step 1105.

When the UE is in RRC_CONNECTED, the UE may report the measurement results of the frequencies included in the second measurement configuration, to the network. For example, the measurement results may be stored in step 1105 for the early measurement on the frequencies included in the second measurement configuration (for example, early measurement configuration).

According to some embodiments of the present disclosure, among the frequencies of which measurement results is to be reported, if a frequency is selected frequency in the step 1107, the UE may include an indication which indicates that the UE performed the relaxed measurement on the frequency in the measurement reporting.

According to some embodiments of the present disclosure, among the frequencies of which measurement results is to be reported, if a frequency is selected frequency in the step 1107, the UE may include information on a time length of how long the UE has performed the relaxed measurement on the frequency in the measurement reporting.

Figure 12:
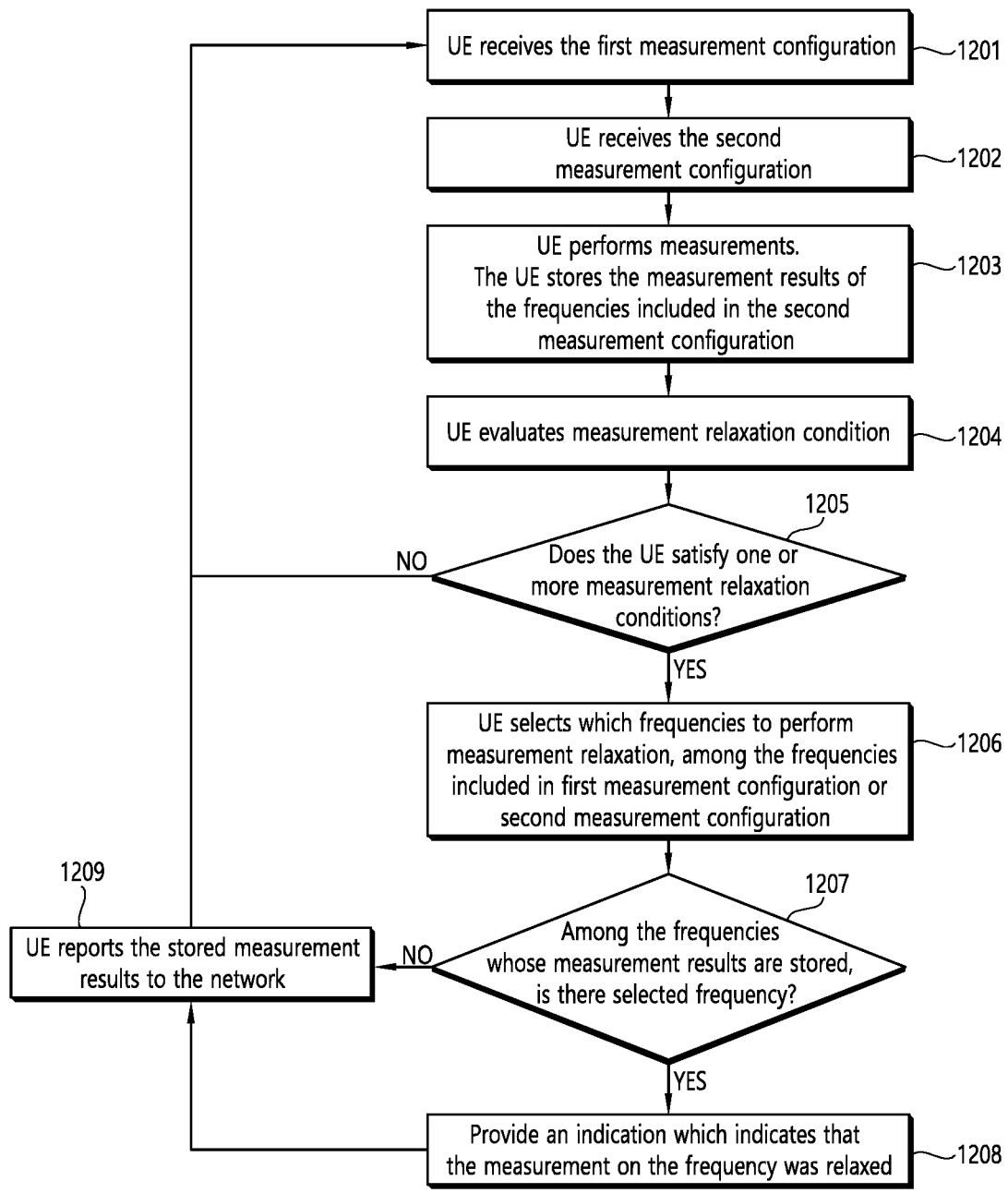
FIG. 12 shows a diagram of a procedure for informing relaxed measurement upon early measurement reporting in a wireless communication system, according to some embodiments of the present disclosure.

FIG. 12 shows a diagram of a procedure for informing relaxed measurement upon early measurement reporting in a wireless communication system, according to some embodiments of the present disclosure. In particular, FIG. 12 shows diagram of a method for performing measurements by a UE.

In step 1201, UE may receive the first measurement configuration.

For example, the first measurement configuration may be for.

For example, the first measurement configuration may include relaxed measurement configuration.

For example, the procedure for controlling relaxed measurement may be initiated with receiving the first measurement configuration.

In step 1202, UE may receive the second measurement configuration.

For example, the second measurement configuration may include idle mode measurement configuration.

For example, the second measurement configuration may include one or more measurement relaxation condition (or relaxed measurement condition).

In step 1203, UE may perform measurements. The UE may perform measurements on frequencies included in the first measurement configuration or the second measurement configuration. The UE may store the measurement results on the frequency included in the second measurement configuration.

For example, UE may perform measurement on serving cell and/or neighbour cell while in idle state and/or inactive state based on the first measurement configuration.

For example, UE may perform measurement on frequencies included in the second measurement configuration while in idle state and/or inactive state based on the second measurement configuration. The UE may store the measurement results on the frequency included in the second measurement configuration while in idle state and/or inactive state.

In step 1204, UE may evaluate measurement relaxation condition (or relaxed measurement condition).

In step 1205, UE may determine whether the UE satisfies one or more measurement relaxation condition (or relaxed measurement condition).

According to some embodiments of the present disclosure, if the UE satisfies the one or more measurement relaxation condition, UE may perform step 1206.

According to some embodiments of the present disclosure, if the UE does not satisfy at least one of the measurement relaxation condition, the UE may not perform the relaxed measurement.

In this case, for example, if the UE does not satisfy at least one of the measurement relaxation condition, UE may perform steps 1203 to 1206 again. In other words, the UE may evaluate whether the relaxed measurement conditions are met based on each measurement results performed in step 1203.

For another example, UE may initiate another relaxed measurement procedure later, when the UE receive the first measurement configuration again. In other word, the UE may perform step 1201 again for another relaxed measurement procedure.

In step 1206, UE may select which frequencies to perform the measurement relaxation (or the relaxed measurement), among the frequencies included in the first measurement configuration or the second measurement configuration.

For example, the UE may select frequencies for the relaxed measurement from the first measurement configuration.

In step 1207, the UE may determines whether there is selected frequency, among the frequencies whose measurement results are stored.

For example, the UE may have stored the measurement results for frequencies based on the second measurement configuration while in idle state and/or inactive state. The UE may determine whether each frequency related to the measurement results is included in the selected frequencies for the relaxed measurement or not.

In step 1208, if there is selected frequency, the UE may provide an indication which indicates that the measurement on the frequency was relaxed.

For example, if a certain frequency related to the stored measurement results is one of the selected frequencies for the relaxed measurement, the UE may provide the indication which indicates that the stored measurement results on the certain frequency is output of the relaxed measurement performed in idle state and/or inactive state.

For other example, if a certain frequency related to the stored measurement results is not one of the selected frequencies for the relaxed measurement, the UE may include the indication which indicates that the stored measurement results on the certain frequency is output of normal measurement performed in idle state and/or inactive state.

For example, the provided indication may be reported to the network with the measurement results in step 1209.

In step 1209, UE may report the stored measurement results

For example, UE may transmit, to the network, a measurement report including the stored measurement results and the indication provided in step 1208.

Hereinafter, an apparatus for informing relaxed measurement upon early measurement reporting in a wireless communication system, according to some embodiments of the present disclosure, will be described. Herein, the apparatus may be a wireless device (100 or 200) in FIGS. 2, 3, and 5.

For example, a wireless device may perform methods described in FIGS. 10 to 12. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, a first measurement configuration including at least one of relaxed measurement conditions. The processor 102 may be configured to control the transceiver 106 to receive, from a network, a second measurement configuration for a frequency set to be reported. The processor 102 may be configured to control the transceiver 106 to perform measurement on a serving frequency based on the first measurement configuration. The processor 102 may be configured to control the transceiver 106 to evaluate the at least one of the relaxed measurement conditions based on measurement results of the serving frequency. The processor 102 may be configured to control the transceiver 106 to perform relaxed measurement on the serving frequency and/or the at least one of neighbor frequencies based on the evaluation. The processor 102 may be configured to control the transceiver 106 to transmit, to the network, a message including 1) measurement results on each frequency of the frequency set, and 2) information on the relaxed measurement on the each frequency of the frequency set.

According to some embodiments of the present disclosure, the information may further inform whether the relaxed measurement is performed on the each frequency of the frequency set.

According to some embodiments of the present disclosure, the information may further inform time length of how long the relaxed measurement on the each frequency of the frequency set is performed.

According to some embodiments of the present disclosure, the processor 102 may be configured to control the transceiver 106 to select one or more frequencies among the serving frequency and/or the at least one of the neighbor frequencies.

The processor 102 may be configured to control the transceiver 106 to perform the relaxed measurement on the selected one or more frequencies.

For example, the processor 102 may be configured to control the transceiver 106 to select a certain frequency among the serving frequency and/or the at least one of the neighbor frequencies based on that a highest ranked cell of the certain frequency is below a threshold value. For example, the threshold value may be included in the first measurement configuration.

For example, the processor 102 may be configured to control the transceiver 106 to select a certain frequency among the serving frequency and/or the at least one of the neighbor frequencies based on that quality of a cell on the certain frequency does not change more than a relative threshold value during a time period. For example, the relative value may be included in the first measurement configuration.

For example, the processor 102 may be configured to control the transceiver 106 to select a certain frequency among the serving frequency and/or the at least one of the neighbor frequencies based on that a certain frequency is included in a frequency list for the relaxed measurement. For example, the frequency list for the relaxed measurement may be included in the first measurement configuration.

According to some embodiments of the present disclosure, the performing the first relaxed measurement may include at least one of 1) performing no measurement on the serving frequency and/or the at least one of the neighbor frequencies, 2) extending time period of measurement on the serving frequency and/or the at least one of the neighbor frequencies, and/or 3) reducing number of cells, carriers, and/or Synchronization Signal Block (SSB) to be measured for measurement on the serving frequency and/or the at least one of the neighbour frequencies.

According to some embodiments of the present disclosure, the first measurement configuration may include a first relaxed measurement condition, which is that the wireless device is stationary or with low mobility. For example, the wireless device be considered as stationary or with low mobility based on that measurement results of a serving cell does not change more than a first threshold value during a time period.

According to some embodiments of the present disclosure, the first measurement configuration may include a second relaxed measurement condition, which is that the wireless device is not at cell edge. For example, the wireless device may be considered as being not at cell edge based on that measurement results of a serving cell is above a second threshold value.

According to some embodiments of the present disclosure, the processor 102 may be configured to be in communication with at least one of a user equipment, a network, or an autonomous vehicle other than the wireless device.

Hereinafter, a processor for a wireless device for informing relaxed measurement upon early measurement reporting in a wireless communication system, according to some embodiments of the present disclosure, will be described.

The processor may be configured to control the wireless device to receive, from a network, a first measurement configuration including at least one of relaxed measurement conditions. The processor may be configured to control the wireless device to receive, from a network, a second measurement configuration for a frequency set to be reported. The processor may be configured to control the wireless device to perform measurement on a serving frequency based on the first measurement configuration. The processor may be configured to control the wireless device to evaluate the at least one of the relaxed measurement conditions based on measurement results of the serving frequency. The processor may be configured to control the wireless device to perform relaxed measurement on the serving frequency and/or the at least one of neighbor frequencies based on the evaluation. The processor may be configured to control the wireless device to transmit, to the network, a message including 1) measurement results on each frequency of the frequency set, and 2) information on the relaxed measurement on the each frequency of the frequency set.

According to some embodiments of the present disclosure, the information may further inform whether the relaxed measurement is performed on the each frequency of the frequency set.

According to some embodiments of the present disclosure, the information may further inform time length of how long the relaxed measurement on the each frequency of the frequency set is performed.

According to some embodiments of the present disclosure, the processor may be configured to control the wireless device to select one or more frequencies among the serving frequency and/or the at least one of the neighbor frequencies.

The processor may be configured to control the wireless device to perform the relaxed measurement on the selected one or more frequencies.

For example, the processor may be configured to control the wireless device to select a certain frequency among the serving frequency and/or the at least one of the neighbor frequencies based on that a highest ranked cell of the certain frequency is below a threshold value. For example, the threshold value may be included in the first measurement configuration.

For example, the processor may be configured to control the wireless device to select a certain frequency among the serving frequency and/or the at least one of the neighbor frequencies based on that quality of a cell on the certain frequency does not change more than a relative threshold value during a time period. For example, the relative value may be included in the first measurement configuration.

For example, the processor may be configured to control the wireless device to select a certain frequency among the serving frequency and/or the at least one of the neighbor frequencies based on that a certain frequency is included in a frequency list for the relaxed measurement. For example, the frequency list for the relaxed measurement may be included in the first measurement configuration.

According to some embodiments of the present disclosure, the performing the first relaxed measurement may include at least one of 1) performing no measurement on the serving frequency and/or the at least one of the neighbor frequencies, 2) extending time period of measurement on the serving frequency and/or the at least one of the neighbor frequencies, and/or 3) reducing number of cells, carriers, and/or Synchronization Signal Block (SSB) to be measured for measurement on the serving frequency and/or the at least one of the neighbour frequencies.

According to some embodiments of the present disclosure, the first measurement configuration may include a first relaxed measurement condition, which is that the wireless device is stationary or with low mobility. For example, the wireless device be considered as stationary or with low mobility based on that measurement results of a serving cell does not change more than a first threshold value during a time period.

According to some embodiments of the present disclosure, the first measurement configuration may include a second relaxed measurement condition, which is that the wireless device is not at cell edge. For example, the wireless device may be considered as being not at cell edge based on that measurement results of a serving cell is above a second threshold value.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for informing relaxed measurement upon early measurement reporting in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, a first measurement configuration including at least one of relaxed measurement conditions. The stored a plurality of instructions may cause the wireless device to receive, from a network, a second measurement configuration for a frequency set to be reported. The stored a plurality of instructions may cause the wireless device to perform measurement on a serving frequency based on the first measurement configuration. The stored a plurality of instructions may cause the wireless device to evaluate the at least one of the relaxed measurement conditions based on measurement results of the serving frequency. The stored a plurality of instructions may cause the wireless device to perform relaxed measurement on the serving frequency and/or the at least one of neighbor frequencies based on the evaluation. The stored a plurality of instructions may cause the wireless device to transmit, to the network, a message including 1) measurement results on each frequency of the frequency set, and 2) information on the relaxed measurement on the each frequency of the frequency set.

According to some embodiments of the present disclosure, the information may further inform whether the relaxed measurement is performed on the each frequency of the frequency set.

According to some embodiments of the present disclosure, the information may further inform time length of how long the relaxed measurement on the each frequency of the frequency set is performed.

According to some embodiments of the present disclosure, the stored a plurality of instructions may cause the wireless device to select one or more frequencies among the serving frequency and/or the at least one of the neighbor frequencies.

The stored a plurality of instructions may cause the wireless device to perform the relaxed measurement on the selected one or more frequencies.

For example, the stored a plurality of instructions may cause the wireless device to select a certain frequency among the serving frequency and/or the at least one of the neighbor frequencies based on that a highest ranked cell of the certain frequency is below a threshold value. For example, the threshold value may be included in the first measurement configuration.

For example, the stored a plurality of instructions may cause the wireless device to select a certain frequency among the serving frequency and/or the at least one of the neighbor frequencies based on that quality of a cell on the certain frequency does not change more than a relative threshold value during a time period. For example, the relative value may be included in the first measurement configuration.

For example, the stored a plurality of instructions may cause the wireless device to select a certain frequency among the serving frequency and/or the at least one of the neighbor frequencies based on that a certain frequency is included in a frequency list for the relaxed measurement. For example, the frequency list for the relaxed measurement may be included in the first measurement configuration.

According to some embodiments of the present disclosure, the performing the first relaxed measurement may include at least one of 1) performing no measurement on the serving frequency and/or the at least one of the neighbor frequencies, 2) extending time period of measurement on the serving frequency and/or the at least one of the neighbor frequencies, and/or 3) reducing number of cells, carriers, and/or Synchronization Signal Block (SSB) to be measured for measurement on the serving frequency and/or the at least one of the neighbour frequencies.

According to some embodiments of the present disclosure, the first measurement configuration may include a first relaxed measurement condition, which is that the wireless device is stationary or with low mobility. For example, the wireless device be considered as stationary or with low mobility based on that measurement results of a serving cell does not change more than a first threshold value during a time period.

According to some embodiments of the present disclosure, the first measurement configuration may include a second relaxed measurement condition, which is that the wireless device is not at cell edge. For example, the wireless device may be considered as being not at cell edge based on that measurement results of a serving cell is above a second threshold value.

According to some embodiments of the present disclosure, the stored a plurality of instructions may cause the wireless device to be in communication with at least one of a user equipment, a network, or an autonomous vehicle other than the wireless device.

Hereinafter, a method for informing relaxed measurement upon early measurement reporting performed by a base station (BS) in a wireless communication system, according to some embodiments of the present disclosure, will be described.

The BS may transmit, to a wireless device, a first measurement configuration including at least one of relaxed measurement conditions.

The BS may transmit, to a wireless device, a second measurement configuration for a frequency set to be reported.

The BS may receive, from the wireless device, a message including 1) measurement results on each frequency of the frequency set, and 2) information on the relaxed measurement on the each frequency of the frequency set.

Hereinafter, a base station (BS) for informing relaxed measurement upon early measurement reporting in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, a first measurement configuration including at least one of relaxed measurement conditions.

The processor may be configured to control the transceiver to transmit, to a wireless device, a second measurement configuration for a frequency set to be reported.

The processor may be configured to control the transceiver to receive, from the wireless device, a message including 1) measurement results on each frequency of the frequency set, and 2) information on the relaxed measurement on the each frequency of the frequency set.

The present disclosure can have various advantageous effects.

According to some embodiments of the present disclosure, a wireless device could inform relaxed measurement upon early measurement reporting efficiently in a wireless communication system.

For example, when a wireless device applying relaxed measurement on a certain frequency for early measurements, the wireless device could inform the network that the relaxed measurement has been applied on the certain frequency.

For example, the wireless device could indicate a certain frequency applied the relaxed measurement during reporting the early measurement results.

For example, when a wireless device applying relaxed measurement on at least one frequency for neighbour cell measurements and/or early measurements, the wireless device may indicate the network whether each of early measurement results is relaxed or not.

For example, the wireless device may inform the network a time length of how long the relaxed measurement on each frequency has been performed.

For example, the network may receive the early measurement results with indication of the relaxed measurement and/or the time period that the relaxed measurement has been performed.

Therefore, the network could receive the early measurement results successfully. For example, the network could recognize whether the relaxed measurement has been performed or how long the relaxed measurement has been performed.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
receiving, from a network, a first measurement configuration for relaxed measurements, wherein the first measurement configuration includes 1) information on at least one of relaxed measurement conditions and 2) information on a first frequency set which is subject to the relaxed measurements,
wherein the first measurement configuration is provided via broadcast system information block type 2 (SIB2);
receiving, from the network, a second measurement configuration for idle mode measurements, wherein the second measurement configuration includes information on a second frequency set to be reported;

performing measurement on a serving frequency, while in a radio resource control (RRC) idle state or an RRC inactive state;

evaluating the at least one of the relaxed measurement conditions based on measurement results of the serving frequency;

based on that the at least one of relaxed measurement conditions is met, selecting one or more frequencies to perform the relaxed measurements, wherein the selected one or more frequencies are included in both the first frequency set and the second frequency set;

performing the relaxed measurements on the selected one or more frequencies while in the RRC idle state or the RRC inactive state, based on the evaluation; and after transitioning to an RRC connected state, transmitting, to the network, a measurement report including 1) measurement results on each frequency of the second frequency set, 2) information on the selected one or more frequencies, and 3) information on a time period during which the relaxed measurements has been performed for the selected one or more frequencies.

2. The method of claim 1, wherein the measurement report further includes information on whether the relaxed measurement is performed on the each frequency of the second frequency set.

3. The method of claim 1, wherein the measurement report further includes information on time length of how long the relaxed measurement on the each frequency of the second frequency set is performed.

4. The method of claim 1, wherein the selecting one or more frequencies further comprises,
 selecting a certain frequency among the second frequency set, based on that a highest ranked cell of the certain frequency is below a threshold value,
 wherein the threshold value is included in the first measurement configuration.

5. The method of claim 1, wherein the selecting one or more frequencies further comprises,
 selecting a certain frequency among the second frequency set, based on that quality of a cell on the certain frequency does not change more than a relative threshold value during a time period,
 wherein the relative threshold value is included in the first measurement configuration.

6. The method of claim 1, wherein the selecting one or more frequencies further comprises,
 selecting a certain frequency among the second frequency set, based on that a certain frequency is included in, the first frequency set.

7. The method of claim 1, wherein the performing the relaxed measurements on the selected one or more frequencies comprises at least one of:
 1) performing no measurement on the selected one or more frequencies,
 2) extending time period of measurement on the selected one or more frequencies, or
 3) reducing a number of cells, carriers, and/or Synchronization Signal Block (SSB) to be measured for measurements on the selected one or more frequencies.

8. The method of claim 1, wherein the first measurement configuration includes a first relaxed measurement condition, which is that the wireless device is stationary or with low mobility.

9. The method of claim 8, wherein the wireless device is considered as stationary or with low mobility based on that measurement results of a serving cell does not change more than a first threshold value during a time period.

10. The method of claim 1, wherein the first measurement configuration includes a second relaxed measurement condition, which is that the wireless device is not at cell edge.

11. The method of claim 10, wherein the wireless device is considered as being not at the cell edge based on that measurement results of a serving cell is above a second threshold value.

12. The method of claim 1, wherein the wireless device is in communication with at least one of a user equipment, a network, or an autonomous vehicle other than the wireless device.

13. A wireless device in a wireless communication system comprising:
 a transceiver;
 a memory; and
 at least one processor operatively coupled to the transceiver and the memory, and configured to:
 receive, from a network, a first measurement configuration for relaxed measurements, wherein the first measurement configuration includes 1) information on at least one of relaxed measurement conditions and 2) information on a first frequency set which is subject to the relaxed measurements,
 wherein the first measurement configuration is provided via broadcast system information block type 2 (SIB2);
 receive, from the network, a second measurement configuration for idle mode measurements, wherein the second measurement configuration includes information on a second frequency set to be reported;
 perform measurement on a serving frequency, while in a radio resource control (RRC) idle state or an RRC inactive state;
 evaluate the at least one of the relaxed measurement conditions based on measurement results of the serving frequency;
 based on that the at least one of relaxed measurement conditions is met, selecting one or more frequencies to perform the relaxed measurements,
 wherein the selected one or more frequencies are included in both the first frequency set and the second frequency set;
 perform the relaxed measurements on the selected one or more frequencies while in the RRC idle state or the RRC inactive state, based on the evaluation; and
 after transitioning to an RRC connected state, transmit, to the network, a measurement report including 1) measurement results on each frequency of the second frequency set, 2) information on the selected one or more frequencies, and 3) information on a time period during which the relaxed measurements has been performed for the selected one or more frequencies.

14. A processor for a wireless device in a wireless communication system, wherein the processor is configured to control the wireless device to perform operations comprising:
 receiving, from a network, a first measurement configuration for relaxed measurements, wherein the first measurement configuration includes 1) information on at least one of relaxed measurement conditions and 2) information on a first frequency set which is subject to the relaxed measurements,
 wherein the first measurement configuration is provided via broadcast system information block type 2 (SIB2);
 receiving, from the network, a second measurement configuration for idle mode measurements, wherein the second measurement configuration includes information on a second frequency set to be reported;
performing measurement on a serving frequency, while in a radio resource control (RRC) idle state or an RRC inactive state;
evaluating the at least one of the relaxed measurement conditions based on measurement results of the serving frequency;
based on that the at least one of relaxed measurement conditions is met, selecting one or more frequencies to perform the relaxed measurements,
wherein the selected one or more frequencies are included in both the first frequency set and the second frequency set;
performing the relaxed measurements on the selected one or more frequencies while in the RRC idle state or the RRC inactive state, based on the evaluation; and
after transitioning to an RRC connected state, transmitting, to the network, a measurement report including 1) measurement results on each frequency of the frequency set, 2) information on the selected one or more frequencies, and 3) information on a time period during which the relaxed measurements has been performed for the selected one or more frequencies.

* * * * *